United States Patent
Kim

(10) Patent No.: US 10,570,968 B2
(45) Date of Patent: Feb. 25, 2020

(54) CLUTCH REGULATOR FOR VEHICLE

(71) Applicants: HYUNDAI MOTOR COMPANY, Seoul (KR); KIA MOTORS CORPORATION, Seoul (KR)

(72) Inventor: Yonghee Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 113 days.

(21) Appl. No.: 15/784,997

(22) Filed: Oct. 16, 2017

(65) Prior Publication Data

US 2019/0024730 A1 Jan. 24, 2019

(30) Foreign Application Priority Data

Jul. 19, 2017 (KR) ........................ 10-2017-0091250

(51) Int. Cl.
| | |
|---|---|
| *F16D 48/02* | (2006.01) |
| *F16K 1/36* | (2006.01) |
| *F16K 27/02* | (2006.01) |
| *G05D 16/10* | (2006.01) |
| *F16K 17/18* | (2006.01) |

(52) U.S. Cl.
CPC ............ *F16D 25/14* (2013.01); *F16D 48/02* (2013.01); *F16K 1/36* (2013.01); *F16K 17/18* (2013.01); *F16K 27/02* (2013.01); *G05D 16/106* (2013.01); *Y10T 137/7771* (2015.04); *Y10T 137/7779* (2015.04); *Y10T 137/7929* (2015.04)

(58) Field of Classification Search
CPC . F16D 25/14; F16D 48/02; F16K 1/36; F16K 27/02; F16K 17/18; G05D 16/106; Y10T 137/7929; Y10T 137/7771; Y10T 137/7779
USPC ........... 60/592, 469; 251/186, 190, 320, 321
See application file for complete search history.

(56) References Cited

U.S. PATENT DOCUMENTS

| | | | | |
|---|---|---|---|---|
| 1,865,483 | A | * | 7/1932 | Riedel ........................ F16F 9/26 188/313 |
| 1,876,938 | A | * | 9/1932 | Horne ................. F16K 11/0853 122/14.1 |
| 2,264,902 | A | * | 12/1941 | Hill ........................ H01M 2/362 137/540 |
| 2,279,002 | A | * | 4/1942 | MacNeil ................. F16K 15/02 137/454.2 |
| 2,299,847 | A | * | 10/1942 | Price ........................ F16K 17/04 137/540 |

(Continued)

FOREIGN PATENT DOCUMENTS

| | | |
|---|---|---|
| JP | 2571170 Y2 | 2/1998 |
| JP | 2008-240780 A | 10/2008 |

(Continued)

*Primary Examiner* — Marina A Tietjen
*Assistant Examiner* — Frederick D Soski
(74) *Attorney, Agent, or Firm* — Morgan, Lewis & Bockius LLP

(57) ABSTRACT

A clutch regulator for vehicle comprises a main body provided with an oil passage inside thereof; an opening and closing member provided inside of the main body in a slide manner to open and close the oil passage; an elastic member configured to elastically press the opening and closing member toward the oil passage side; and a plug member installed in the main body to support the elastic member.

12 Claims, 8 Drawing Sheets

(56) References Cited

U.S. PATENT DOCUMENTS

| | | | | |
|---|---|---|---|---|
| 2,599,979 A * | 6/1952 | Drane | F16K 17/19 | 137/493 |
| 3,090,201 A * | 5/1963 | May | F15B 21/00 | 188/298 |
| 3,333,604 A * | 8/1967 | Birdwell | F16K 47/02 | 138/30 |
| 4,163,461 A * | 8/1979 | Jacobellis | F16L 55/053 | 138/30 |
| 4,244,395 A * | 1/1981 | Griswold | E03C 1/104 | 137/484.2 |
| 4,301,908 A * | 11/1981 | Fukuda | B60K 23/02 | 188/380 |
| 4,427,029 A * | 1/1984 | Charney | B01D 15/163 | 138/30 |
| 4,629,562 A * | 12/1986 | Kercher | B01D 15/163 | 138/30 |
| 4,949,750 A * | 8/1990 | Goodwin | F16K 17/0453 | 137/493.8 |
| 5,070,983 A * | 12/1991 | Leigh-Monstevens | F16D 25/14 | 192/109 F |
| 5,161,864 A * | 11/1992 | Cardenas | B60T 8/32 | 138/30 |
| 5,410,945 A * | 5/1995 | Schops | B60T 8/4068 | 188/DIG. 1 |
| 5,564,466 A * | 10/1996 | Aoyama | B60K 15/03519 | 123/518 |
| 5,752,546 A * | 5/1998 | Yamashita | F15B 13/01 | 137/540 |
| 5,816,046 A * | 10/1998 | Paeth | B60K 23/02 | 60/469 |
| 6,148,614 A * | 11/2000 | Nix | F16D 25/088 | 138/30 |
| 6,430,928 B1 * | 8/2002 | Iyer | F16D 25/12 | 60/592 |
| 6,574,960 B2 * | 6/2003 | Kleibrink | F04B 45/04 | 60/592 |
| 6,745,886 B1 * | 6/2004 | Rey | F15B 21/008 | 192/109 F |
| 7,350,354 B2 * | 4/2008 | Tulaczko | F15B 1/021 | 192/109 F |
| 8,485,214 B2 * | 7/2013 | Erdmann | F02M 25/0836 | 137/197 |
| 2002/0129603 A1 * | 9/2002 | Schorr | F16D 25/12 | 60/592 |
| 2003/0102031 A1 * | 6/2003 | Igarashi | F16K 17/0433 | 137/469 |
| 2004/0026208 A1 * | 2/2004 | Nix | F16D 25/14 | 192/109 F |
| 2015/0083242 A1 * | 3/2015 | Hirai | F16K 17/0433 | 137/540 |
| 2018/0023636 A1 * | 1/2018 | Guleryuz | F16D 25/14 | 192/85.63 |
| 2019/0024730 A1 * | 1/2019 | Kim | F16D 25/14 | |

FOREIGN PATENT DOCUMENTS

| | | |
|---|---|---|
| KR | 10-0516767 B1 | 11/2005 |
| KR | 20-0429589 Y1 | 10/2006 |
| KR | 10-0747033 B1 | 8/2007 |
| KR | 10-1126465 B1 | 3/2012 |
| KR | 10-1357390 B1 | 2/2014 |

* cited by examiner

CLUTCH REGULATOR FOR VEHICLE

CROSS-REFERENCE TO RELATED APPLICATION

This application claims the benefit of Korean Patent Application No. 10-2017-0091250, filed on Jul. 19, 2017 in the Korean Intellectual Property Office, the disclosure of which is incorporated herein by reference.

BACKGROUND

Field

Embodiments of the present disclosure relate to a regulator, more particularly to a clutch regulator for vehicle used in a clutch system of vehicle.

Description of Related Art

In general, a manual transmission for a vehicle is a device for shifting a gear by lifting a clutch disc by a hydraulic pressure generated as a clutch pedal is operated by a driver.

When a vehicle drives, vibration occurs during operation of the engine, transmission, and clutch, and such vibration may be transmitted to the clutch pedal through the hydraulic line between the clutch pedal and the clutch disc to cause discomfort to the driver.

In order to solve this problem, a regulator for reducing the vibration transmitted to the clutch pedal is provided on the hydraulic line between the clutch disc and the clutch pedal, and an anti-vibration unit (AVU) is installed in a position adjacent to the transmission, thereby minimizing the transmission of the vibration.

Although the regulator and the anti-vibration unit having different structure are installed, the regulator and the anti-vibration unit have the same function, which causes a problem of increased cost and weight.

SUMMARY

Therefore, it is an aspect of the present disclosure to provide a clutch regulator for vehicle that is configured as a single product capable of reducing a vibration and a noise, which is a function of a conventional regulator, while acting as an anti-vibration unit, at the same time, so as to reduce the manufacture cost and the weight thereof.

Additional aspects of the present disclosure will be set forth in part in the description which follows and, in part, will be obvious from the description, or may be learned by practice of the present disclosure.

In accordance with one aspect of the present invention, a clutch regulator for vehicle comprising: a main body provided with an oil passage inside thereof; an opening and closing member provided inside of the main body in a slide manner to open and close the oil passage; an elastic member configured to elastically press the opening and closing member toward the oil passage side; and a plug member installed in the main body to support the elastic member.

Also, the main body comprises a body portion formed in a cylindrical shape and provided with a first port portion provided in one side thereof and a second port portion provided in the other side thereof in a longitudinal direction, a coupling portion configured to protrude radially outward between one side and the other side of the body portion and configured to be coupled to the plug member, and a partition formed inside of the body portion and configured to divide the oil passage into a first oil passage connected to the first port portion and a second oil passage connected to the second port portion.

Also, the body portion, the coupling portion and the partition may be formed as a single body by the injection mold method.

Also, the partition protrudes toward an open portion of the coupling portion while crossing a diameter direction of the coupling portion.

Also, the first oil passage and the second oil passage, each are provided with a transverse oil passage between the port portion and the partition and a longitudinal oil passage between the partition and the inner wall of the coupling portion by the coupling portion, wherein the longitudinal oil passage is formed to have an area larger than an area of the transverse oil passage.

Also, a male thread is formed in an outer circumference of the coupling portion and a female thread engaged with the male thread is formed in an inner circumference of the plug member.

Also, the coupling portion is provided with a support projection protruding radially inward from the inner circumferential surface of the coupling portion, wherein an edge portion of the coupling portion is in contact with a lower surface of the support projection and when the opening and closing member is in contact with the support projection, an end portion of the partition is brought into contact with the opening and closing member so as to close the oil passage.

Also, the opening and closing member has a rounded concave dish shape and a contact surface of the support projection making contact with the opening and closing member has a curved surface corresponding to the opening and closing member.

Also, the contact surface of the partition making contact with the opening and closing member is formed to have a curvature different from a curvature of the contact surface of the opening and closing member.

Also, an upper guide protrusion guiding one end of the elastic member and preventing the elastic member from being separated is formed at a lower end of the opening and closing member, and a lower guide protrusion guiding the other end of the elastic member and preventing the elastic member from being separated is formed at the plug member facing the upper guide protrusion.

In accordance with another aspect of the present invention, a vehicle has the above-described clutch regulator.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
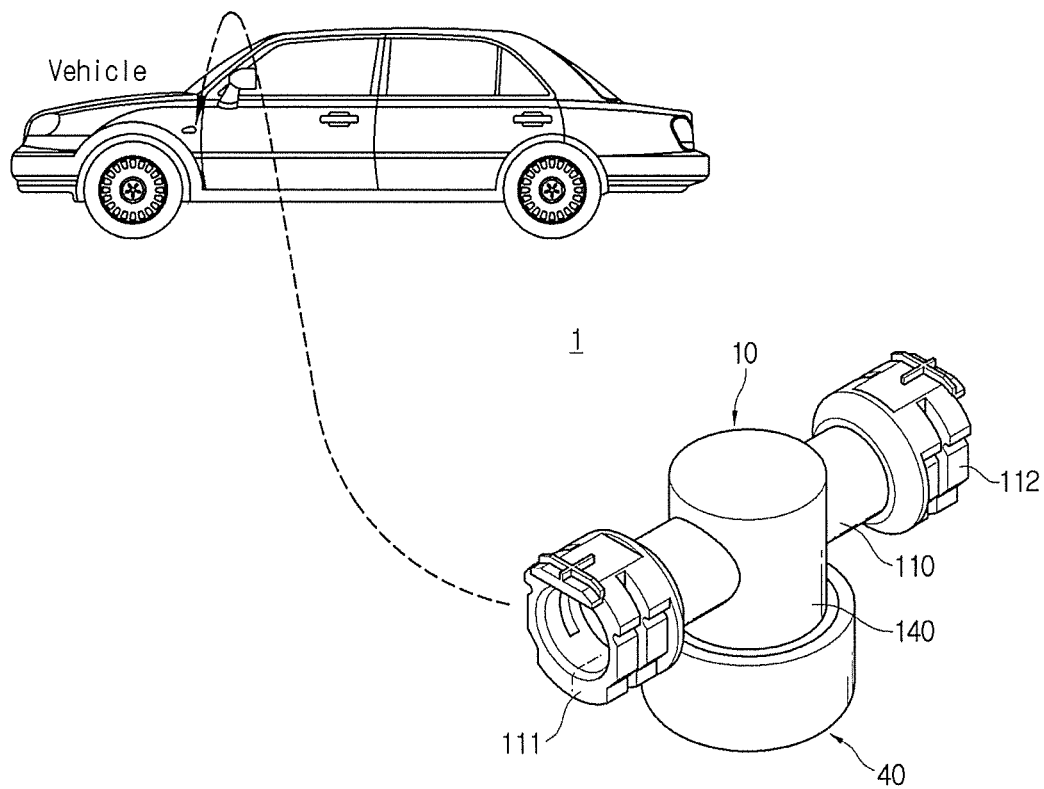
FIG. 1 shows a perspective view of a clutch regulator for a vehicle in accordance with an embodiment of the present disclosure.

Embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function.

Also, the terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

In the following detailed description, the terms of "front side", "rear side", "upper portion", and "lower portion" may be defined by the drawings, but the shape and the location of the component is not limited by the term.

In the following description, a vehicle refers to various apparatuses for moving the object to be transported from the origin to the destination, such as human, goods, or animals. The vehicle may include vehicles that travel on roads or tracks, ships that travel over the sea or river, and airplanes that fly through the sky using the action of the air.

In addition, the vehicle traveling on roads or tracks can move in a predetermined direction by the rotation of at least one wheel, and thus the vehicle may include a three- or four-wheeled vehicle, a construction machine, a two-wheeled vehicle, a motor bicycle, a bicycle and a train travelling on a rail.

Figure 2:
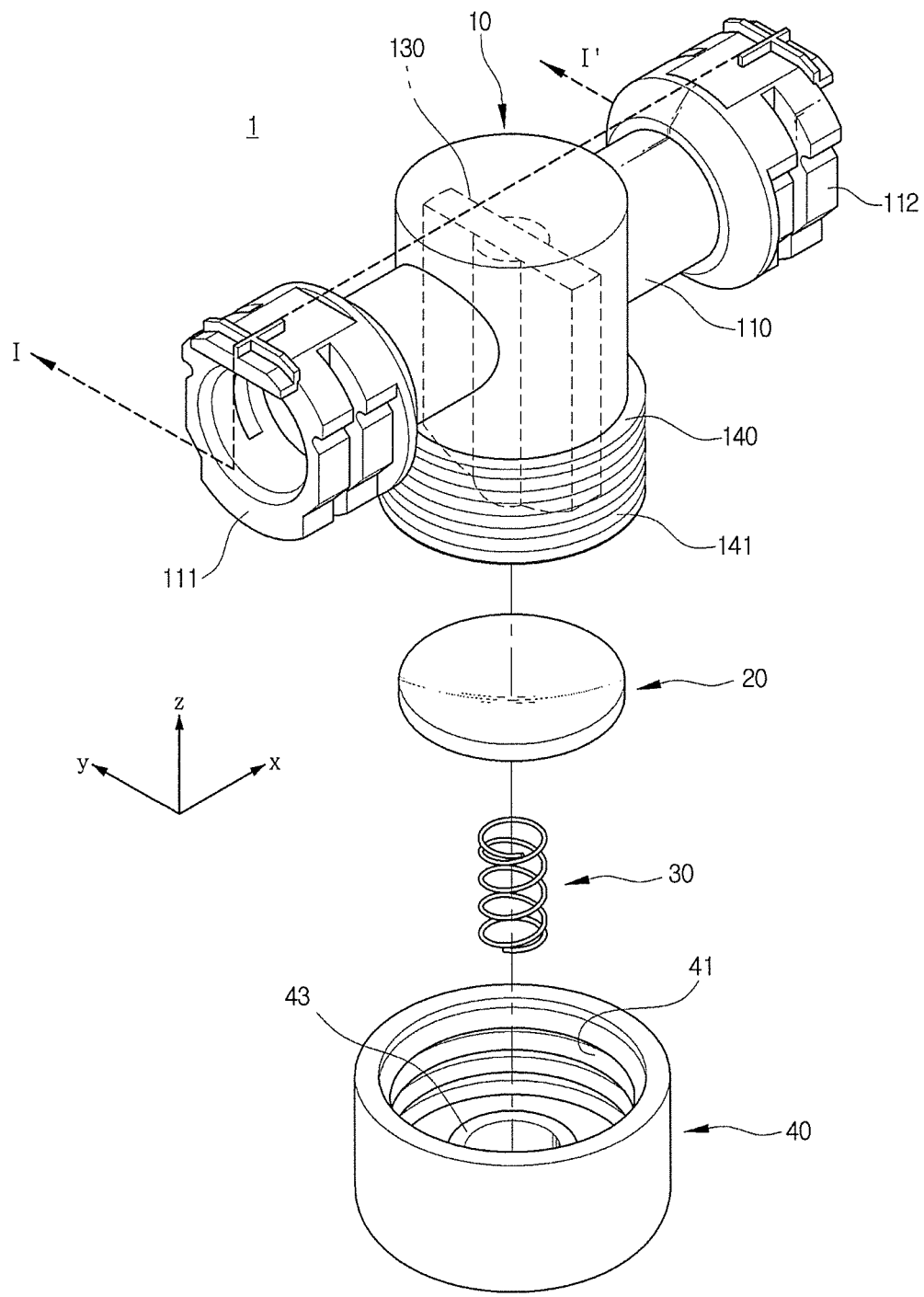
FIG. 2 shows an exploded perspective view of the clutch regulator for the vehicle in accordance with an embodiment of the present disclosure.
Figure 3A:
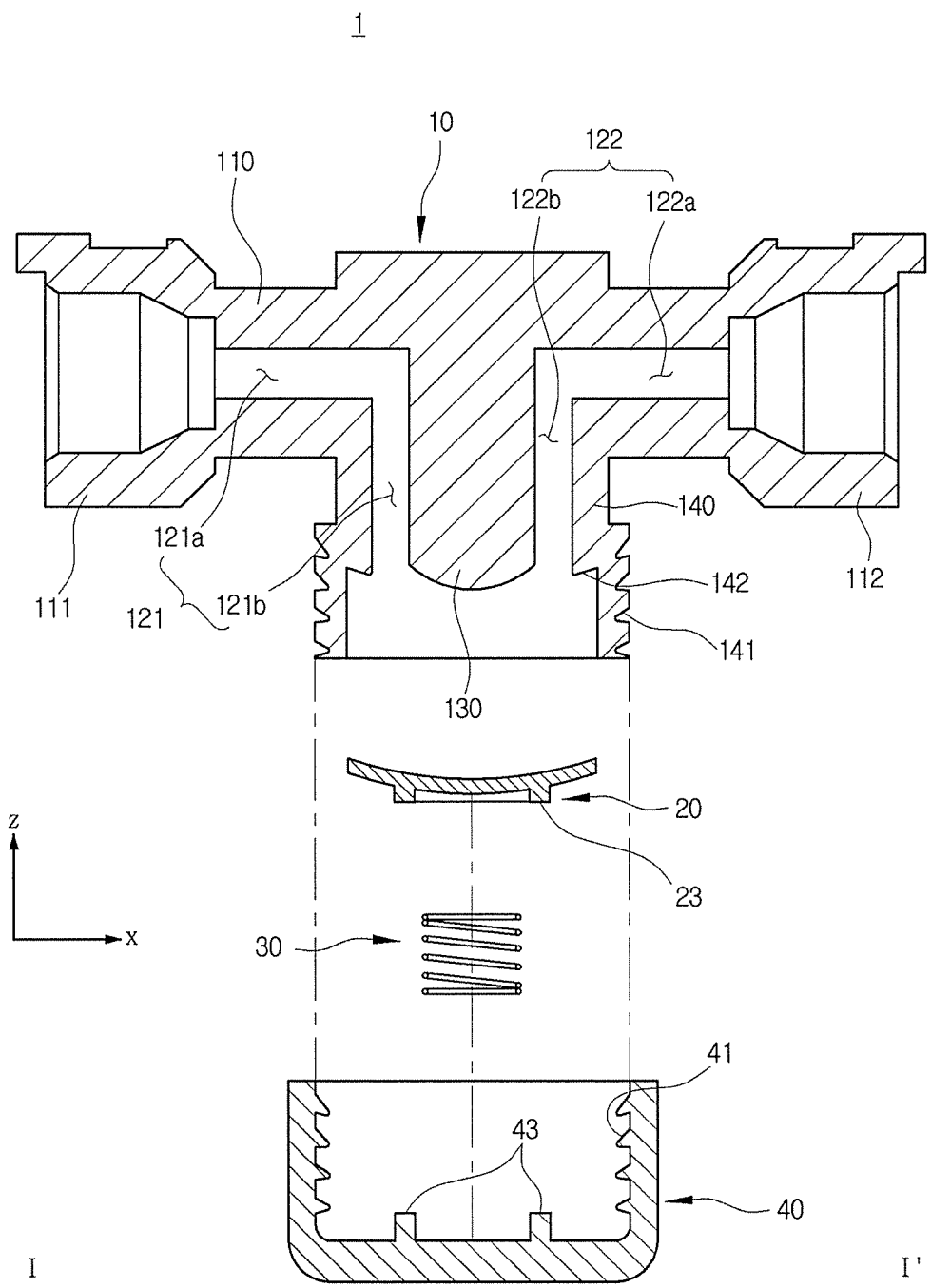
FIG. 3A shows an exploded-cross sectional view of the clutch regulator for the vehicle in accordance with an embodiment of the present disclosure.
Figure 3B:
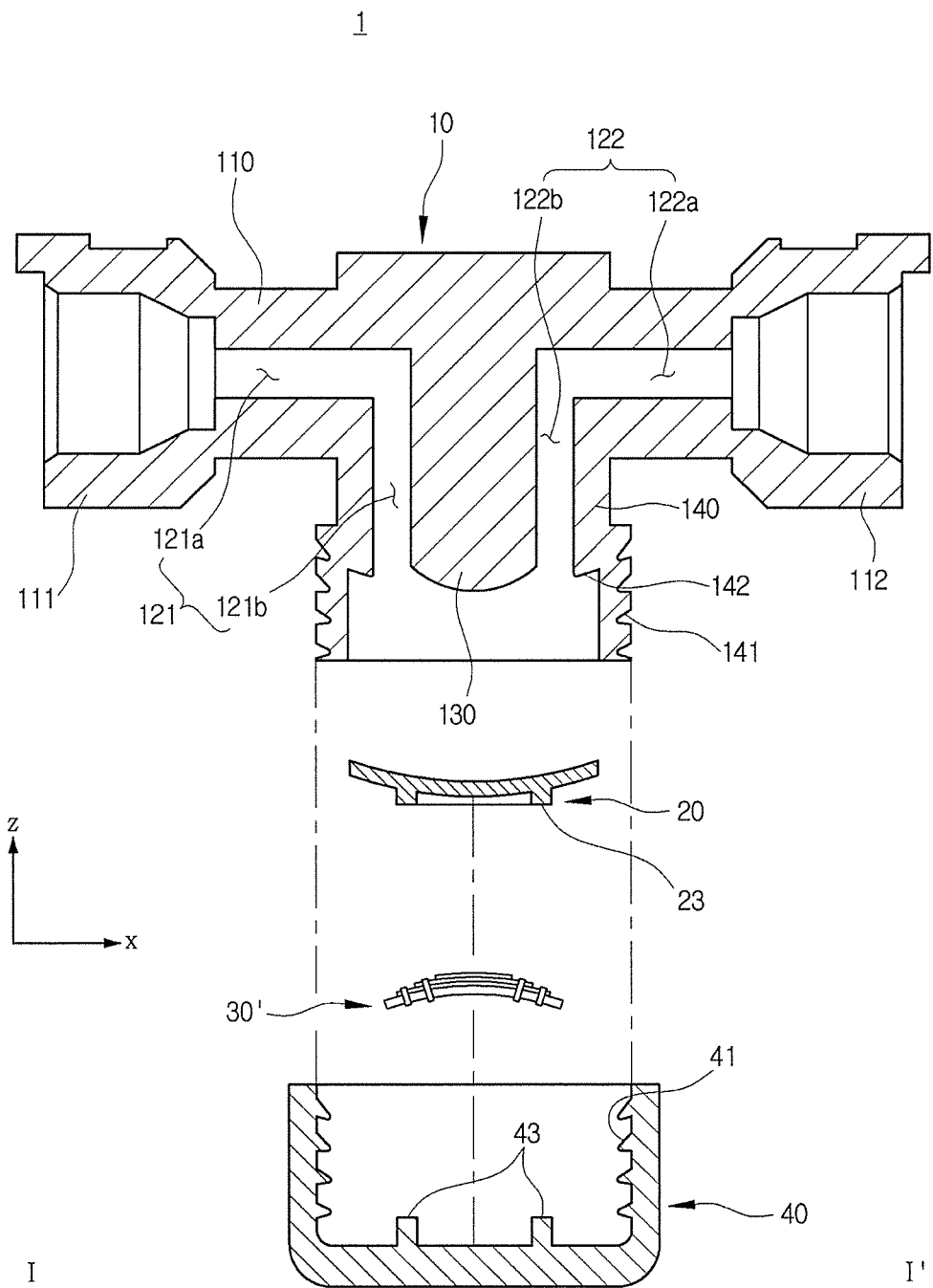
FIG. 3B shows an exploded-cross sectional view of the clutch regulator for vehicle in accordance with another embodiment of the present disclosure.
Figure 4:
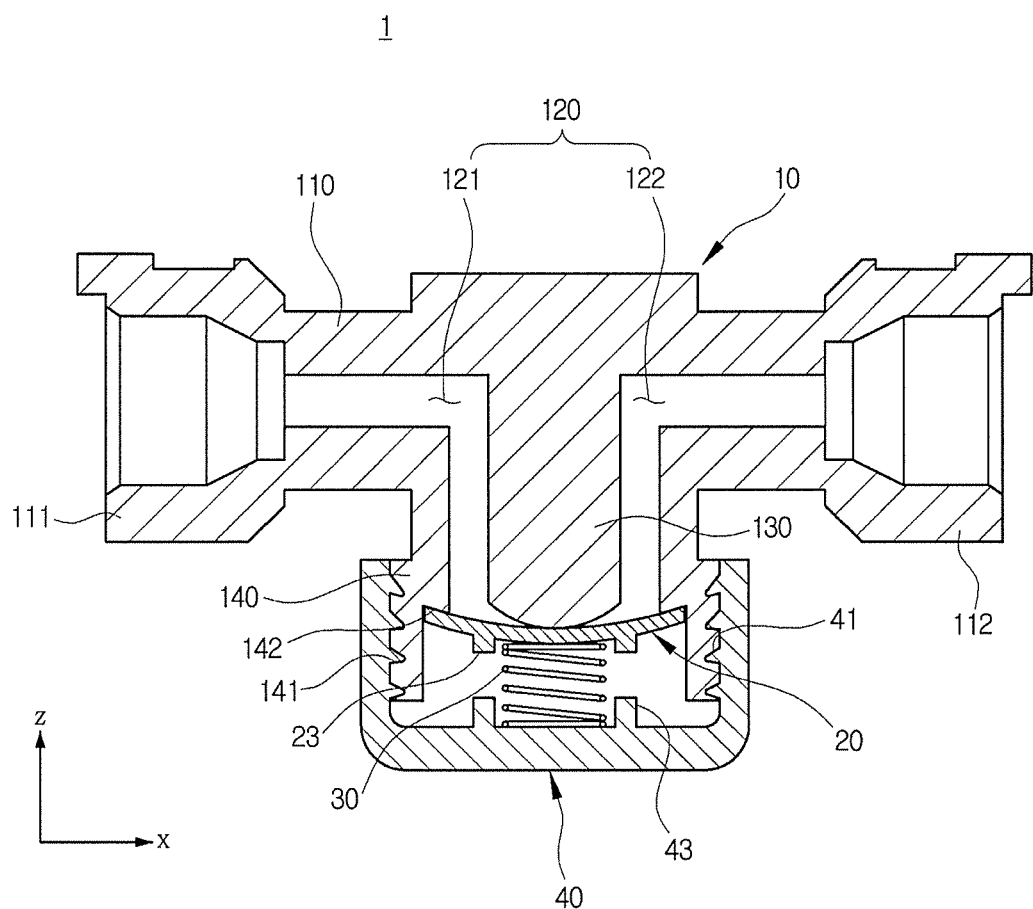
FIG. 4 shows an assembled-cross-sectional view along cross-sectional cut line I-I' of FIG. 2.

The present disclosure will be described more fully hereinafter with reference to the accompanying drawings FIG. 1 is a perspective view of a clutch regulator for vehicle in accordance with an embodiment of the present disclosure, and FIG. 2 is an exploded perspective view of the clutch regulator for vehicle in accordance with an embodiment of the present disclosure, FIG. 3A is an exploded-cross sectional view of the clutch regulator for vehicle in accordance with an embodiment of the present disclosure, FIG. 3B shows an exploded-cross sectional view of the clutch regulator for vehicle in accordance with another embodiment of the present disclosure, and FIG. 4 is an assembled-cross-sectional view of FIG. 3A.

Referring to FIGS. 1 to 4, according to an embodiment, a clutch regulator for vehicle 1 may include a main body 10 forming an appearance of the clutch regulator for vehicle 1 and in which an oil passage 120 is formed; an opening and closing member 20 opening and closing the oil passage 120; an elastic member 30 or 30' elastically pressing the opening and closing member 20; and a plug member 40 supporting the elastic member 30 or 30' and being coupled to the main body 10. The clutch regulator for vehicle 1 may be disposed a hydraulic pressure line (not shown) between a clutch pedal (not shown) and a clutch disk (not shown) in the transmission side so as to prevent a vibration from being transmitted to the clutch pedal.

The main body 10 may include a cylindrical-body portion 110 having a first port portion 111 provided in one side thereof in a longitudinal direction and a second port portion 112 provided in the other side thereof in the longitudinal direction, a coupling portion 140 disposed between the one side and the other side of the body portion 110, and a partition 130 dividing the oil passage 120 into a first oil passage 121 and a second oil passage 122. The main body 10 may be formed of a resin material having the light weight and the low cost. The body portion 110, the coupling portion 140 and the partition 130 forming the main body 10 may be formed as a single body by injection molding method. Therefore, the main body 10 may be entirely formed in a "T" shape, and the left and right side of the body portion 110 in the longitudinal direction and the lower side of the body portion 110 in which the coupling portion 140 is formed may be opened.

The body portion 110 may be connected to the hydraulic pressure line through the first port portion 111 formed in one side and the second port portion 112 formed in the other side. For example, the first port portion 111 may be connected to the clutch pedal and the second port portion 112 may be connected to the transmission side. Alternatively, the first port portion 111 may be connected to the transmission side and the second port portion 112 may be connected to the clutch pedal. The oil passage 120 formed inside of the body portion 110 may be connected to the first port portion 111 and the second port portion 112. In this time, the oil passage 120 may be divided into the first and second oil passage 121 and 122 by the partition 130. The first oil passage 121 may be connected to the first port portion 111 and the second oil passage 122 may be connected to the second port portion 112. The first oil passage 121 and the second oil passage 122 may be connected or disconnected by an opening and closing operation of the opening and closing member 20 described later.

The coupling portion 140 may protrude radially outward between one side and the other side of the body portion 110. As shown, the coupling portion 140 extends downward from the center of the body portion 110. The coupling portion 140 is hollow. That is, the upper side is closed by the body portion 110, and the lower side is opened. In addition, the coupling portion 140 is engaged with the plug member 40 and then closed so that the inside of the main body 10 may become a path for oil flow as the lower side is opened. A male thread 141 is formed on the outer circumferential surface of the coupling portion 140 and a female thread 41 is formed on the inner circumferential surface of the plug member 40 so that the plug member 40 is screwed to the coupling portion 140 and the lower side of the coupling portion 140 is closed.

Meanwhile, the coupling portion 140 has a support projection 142 protruding radially inward from the inner circumferential surface thereof. The support projection 142 is formed to be stepped from the inner circumferential surface of the coupling portion 140 to support the opening and closing member 20 to be described later while setting an initial installation position of the opening and closing member 20. In addition, the support projection 142 may be formed to be in surface contact with the opening and closing member 20. For example, since the opening and closing member 20 is rounded to have a curved surface, the contact surface of the support projection 142, which is in contact with the opening and closing member 20, is formed to have the same curved surface as the opening and closing member 20.

The partition 130 is protruded from the inside of the body portion 110 toward an open portion of the coupling portion 140. The partition 130 is formed to be positioned at the center of the coupling portion 140 while being cross the diameter direction of the coupling portion 140. This is for dividing the space into both sides corresponding to the first oil passage 121 and the second oil passage 122 with respect to the partition 130. The partition 130 is protruded to a position where the support projection 142 of the coupling portion 140 is formed. This is intended to block the connection of the first and second oil passages 121 and 122 when the opening and closing member 20 is in contact with the partition 130. That is, when the opening and closing member 20 is in contact with the support projection 142, the end of the partition 130 is brought into contact with the opening and closing member 20 so as to close the space between the first and second oil passages 121 and 122.

Figure 5:
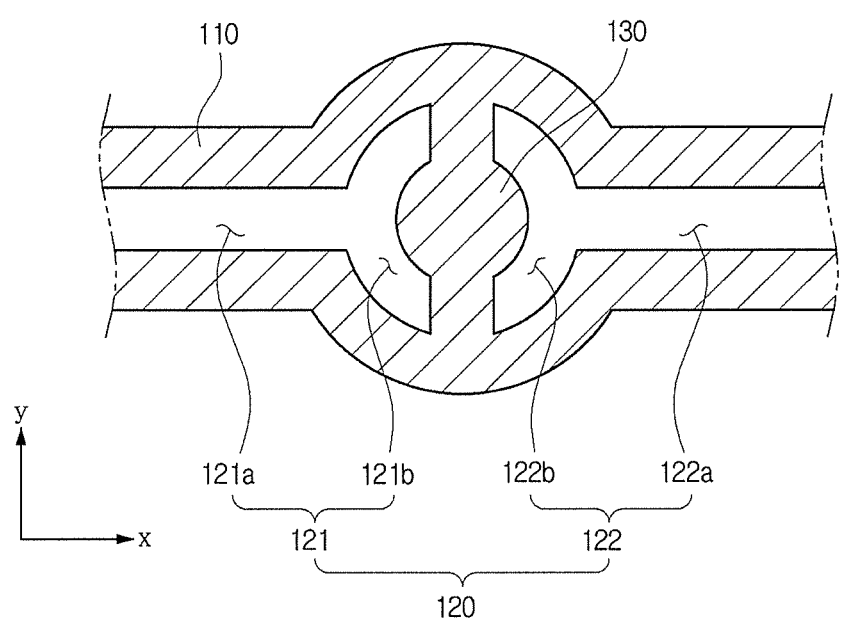
FIG. 5 shows a plan sectional view showing a flow path formed in a main body of the clutch regulator for the vehicle in accordance with an embodiment of the present disclosure.

The first oil passage 121 and the second oil passage 122 are formed on opposite sides with respect to the partition 130. That is, the first oil passage 121 includes a first transverse oil passage 121a formed between the first port portion 111 and the partition 130 and a first longitudinal oil passage 121b formed between the partition 130 and an inner wall of the coupling portion 140. The second oil passage 122 includes a second transverse oil passage 122a formed between the second port portion 112 and the partition 130 and a second longitudinal oil passage 122b formed between the partition 130 and an inner wall of the coupling portion 140. Each of the transverse oil passages 121a and 122a and the longitudinal oil passages 121b and 122b are formed to have different areas. As shown in FIG. 5, each of the longitudinal oil passages 121b and 122b is formed to have an area larger than the area of each of the transverse oil passages 121a and 122a. This is based on the principle of a resonator, and it is to damp the transmission of vibration through the oil passage as the oil passage expands. For example, when the pedaling force of the clutch pedal is provided, the oil flows to the first oil passage 121 through the first port portion 111. In this time, as the oil flows the first longitudinal oil passage 121b that is extended by the first transverse oil passage 121a, the amount of vibration attenuation can be increased. When releasing the clutch pedal, the oil flows from the transmission side to the second oil passage 122 through the second port portion 112. In this time, as the oil flows the second longitudinal oil passage 122b that is extended by the second transverse oil passage 122a, the amount of vibration attenuation can be increased.

Referring again to FIGS. 1 to 4, the opening and closing member 20 is slidably provided in the main body 10 to open and close the oil passage 120. As illustrated in the drawings, the opening and closing member 20 has a rounded concave dish shape. As mentioned above, the contact surface of the support projection 142 setting the initial installation position of the opening and closing member 20 and restricting the movement distance of the opening and closing member 20 is formed by a curved surface corresponding to the opening and closing member 20. When an edge of the opening and closing member 20 is in contact with the support projection 142, the opening and closing member 20 may be in contact with an end portion of the partition 130. This is because the opening and closing member 20 and the partition 130 are provided in contact with each other to block between the first oil passage 121 and the second oil passage 122. At this time, the contact surface of the partition 130 contacting the opening and closing member 20 may be formed to have a curvature different from a curvature of the contact surface of the opening and closing member 20. For example, the curvature value of the contact surface of the partition 130 may be smaller than the curvature value of the curvature of the opening and closing member 20. Therefore, when the oil flows via the first and second oil passages 121 and 122, the oil may press and move the opening and closing member 20 and thus the opening and closing member 20 easily opens the oil passage 120.

The opening and closing member 20 is normally closed when the oil passage 120 is closed. When the pressure is generated by the operation of the clutch pedal, the opening and closing member 20 opens the oil passage 120 to allow the oil to flow. That is, the opening and closing member 20 is elastically pressed toward the oil passage 120 by the elastic member 30 or 30' disposed at the lower side, thereby normally closing the oil passage 120. At this time, an upper guide protrusion 23 for guiding one end of the elastic member 30 or 30' and preventing the release of the elastic member 30 or 30' is formed at the lower end of the opening and closing member 20. The upper guide protrusion 23 is formed in a ring shape so as to allow the elastic member 30 or 30' to be inserted and the upper guide protrusion 23 supports the upper outer side of the elastic member 30 or 30'.

The elastic member 30 or 30' may be provided as a coil spring. One end of the elastic member 30 or 30' is supported by the upper guide protrusion 23 and the other end thereof is supported by the plug member 40.

The plug member 40 has a cylindrical shape with one side opened. The female thread 41 is formed on the inner surface of the plug member 40 to be fastened to the male thread 141 of the coupling portion 140. The plug member 40 is formed with a lower guide protrusion 43 for preventing the release of the elastic member 30 or 30'. The lower guide protrusion 43 is formed to face the upper guide protrusion 23 and has a shape corresponding to the upper guide protrusion 23. The elastic member 30 or 30' is stably disposed between the plug member 40 and the opening and closing member 20 when the plug member 40 is screwed to the coupling portion 140.

Hereinafter the operation state of the clutch regulator for vehicle 1 will be described with reference to FIGS. 4 to 6.

Referring to FIG. 4, when the clutch pedal is not operated, the first and second oil passages 121 and 122 are closed by the opening and closing member 20. Therefore, the vibration generated in the engine or the transmission side of the vehicle cannot be transmitted to the clutch pedal side because the oil passage 120 is blocked by the opening and closing member 20.

Figure 6:
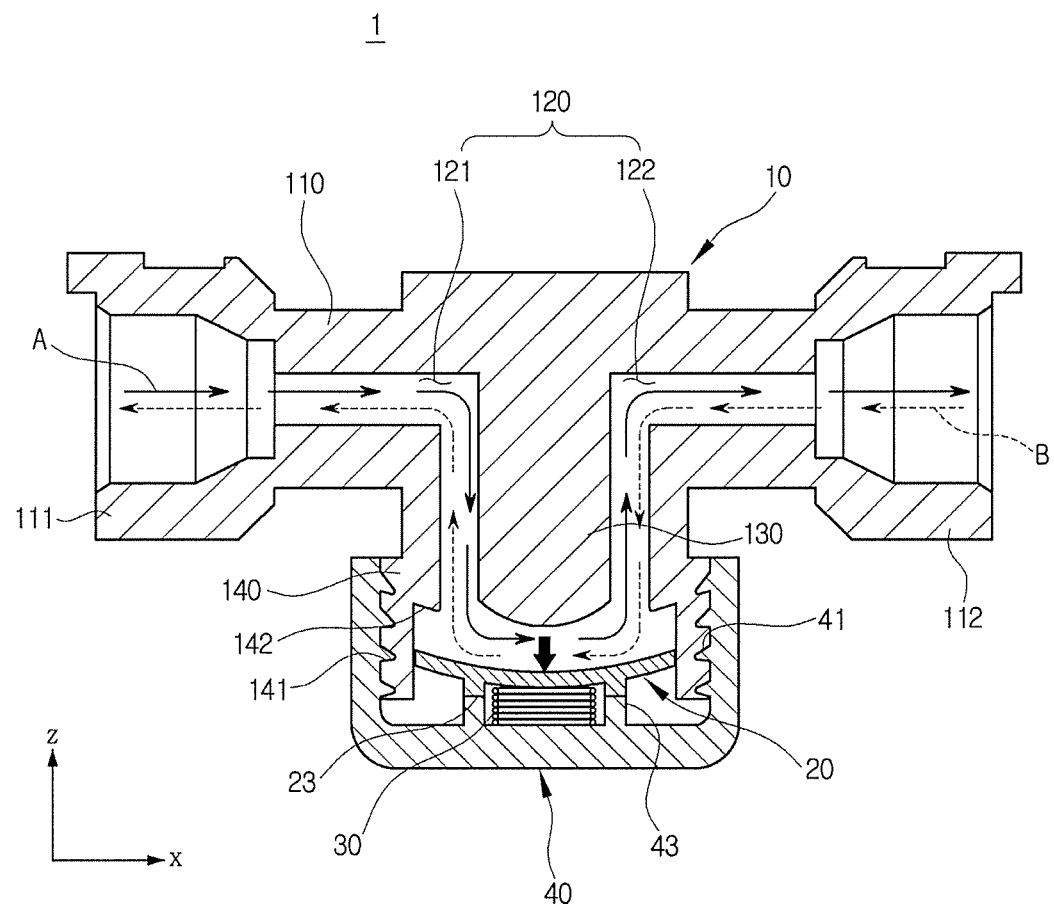
FIG. 6 shows a view showing an operating state of the clutch regulator for the vehicle in accordance with an embodiment of the present disclosure.

Next, a state in which the clutch pedal is operated is illustrated in FIG. 6. Referring to FIG. 6, when a force is applied to the clutch pedal, the pressure may be generated and the oil may flow in the direction of arrow A. That is, the oil flows into the main body 10 through the first port portion 111. At this time, the oil presses the opening and closing member 20 through the first oil passage 121, and the opening and closing member 20 compresses the elastic member 30 or 30'. That is, as the opening and closing member 20 moves, the first and second oil passages 121 and 122 communicate with each other. Accordingly, the oil is discharged to the second port portion 112 through the second oil passage 122 and flows toward the transmission. At this time, the vibration, which is transmitted when the oil passage 120 is opened, is absorbed by the deformation of the elastic member 30 or 30' as the opening and closing member 20 compresses and moves the elastic member 30 or 30'. That is, the vibration is absorbed through the opening and closing member 20 and the elastic member 30 and 30', and the vibration is reduced.

In addition, when the pedaling force of the clutch pedal is released, the oil in the transmission side flows in the direction of arrow B. That is, the oil flows into the main body 10 through the second port portion 112. At this time, the oil presses the opening and closing member 20 through the second oil passage 122, and the opening and closing member 20 compresses the elastic member 30 or 30'. That is, as the opening and closing member 20 moves, the first and second oil passages 121 and 122 communicate with each other. Accordingly, the oil is discharged to the first port portion 111 through the first oil passage 121 and flows toward the master cylinder (not shown) of the clutch pedal. At this time, the vibration transmitted when the oil passage 120 is opened, is absorbed by the deformation of the elastic member 30 or 30' as the opening and closing member 20 compresses and moves the elastic member 30 or 30'. That is, the vibration is absorbed through the opening and closing member 20 and the elastic member 30 or 30', and thus the vibration is reduced. In addition, when the oil flows from the transverse direction to the longitudinal direction of each of the oil passages 121 and 122, the oil passage can be expanded to further increase the vibration attenuation amount.

As described above, the vibration caused by the operation of the clutch pedal is not only blocked but also effectively reduced through the clutch regulator for vehicle 1 and thus it may be possible to minimize the vibration transmitted to the clutch pedal.

Figure 7:
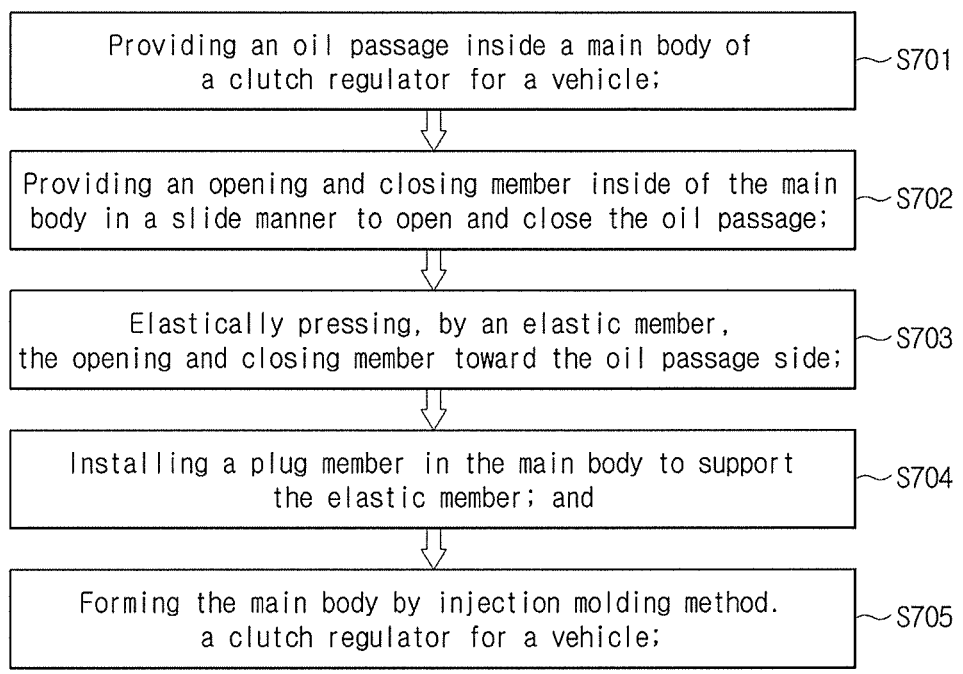
FIG. 7 shows a method of forming a clutch regulator for a vehicle of an embodiment of the present disclosure.

FIG. 7 shows a method of forming a clutch regulator for a vehicle of an embodiment of the present disclosure. The method comprising step 701, i.e. providing an oil passage inside a main body of a clutch regulator for a vehicle; step 702, i.e. providing an opening and closing member inside of the main body in a slide manner to open and close the oil passage; step 703, i.e. elastically pressing, by an elastic member, the opening and closing member toward the oil passage side; and step 704, i.e. installing a plug member in the main body to support the elastic member. Also, the method further comprises step 705, i.e. forming the main body by injection molding method.

As is apparent from the above description, according to the proposed clutch regulator for vehicle, it may be possible to block the vibration by closing the oil passage by the opening and closing member when the clutch pedal is not operated, and it may be possible to reduce the vibration and the noise by opening the oil passage by the opening and closing member when the clutch pedal is operated.

It may be possible to reduce the number of components so as to reduce the manufacture cost and the size and thus the layout of the components may be easily performed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A clutch regulator for a vehicle comprising:
a main body provided with an oil passage inside thereof;
an opening and closing member provided inside of the main body in a slide manner to open and close the oil passage;
an elastic member configured to elastically press the opening and closing member toward the oil passage side; and
a plug member installed in the main body to support the elastic member,
wherein the main body comprises:
 a body portion having a first port portion arranged on one side thereof and a second port portion arranged on another side thereof in a longitudinal direction;
 a partition disposed inside of the body portion and dividing the oil passage into a first oil passage connected to the first port portion and a second oil passage connected to the second port portion; and
 a coupling portion protruding radially outward between the one side and the another side of the body portion, the coupling portion being coupled to the plug member,
wherein the coupling portion includes a support projection protruding radially inward from an inner circumferential surface of the coupling portion,
wherein the first oil passage and the second oil passage are fluidly separated from each other when the opening and closing member is in contact with the partition,
wherein an edge portion of the coupling portion is in contact with a lower surface of the support projection, and
wherein, when the opening and closing member is in contact with the support projection, an end portion of the partition is brought into contact with the opening and closing member so as to close the oil passage.
2. The clutch regulator of claim 1, wherein the body portion, the coupling portion and the partition are a single body.
3. The clutch regulator of claim 1, wherein the partition protrudes toward an open portion of the coupling portion while crossing a diameter direction of the coupling portion.
4. The clutch regulator of claim 3, wherein the first oil passage and the second oil passage each are provided with a transverse oil passage between the port portion and the partition, and a longitudinal oil passage between the partition and the inner wall of the coupling portion by the coupling portion,
wherein the longitudinal oil passage has an area larger than an area of the transverse oil passage.
5. The clutch regulator of claim 1, wherein a male thread is formed in an outer circumference of the coupling portion and a female thread engaged with the male thread is formed in an inner circumference of the plug member.
6. The clutch regulator of claim 1, wherein the opening and closing member has a rounded concave dish shape and a contact surface of the support projection making contact with the opening and closing member has a curved surface corresponding to the opening and closing member.

7. The clutch regulator of claim 6, wherein
the contact surface of the partition making contact with the opening and closing member is formed to have a curvature different from a curvature of the contact surface of the opening and closing member.

8. The clutch regulator of claim 1, wherein
an upper guide protrusion guiding one end of the elastic member and preventing the elastic member from being separated is disposed at a lower end of the opening and closing member, and
a lower guide protrusion guiding the other end of the elastic member and preventing the elastic member from being separated is disposed at the plug member facing the upper guide protrusion.

9. A vehicle having the clutch regulator of claim 1.

10. The clutch regulator of claim 1, wherein
the partition protrudes from and connects two opposing inner walls of the coupling portion to each other.

11. A clutch regulator for a vehicle comprising: a main body provided with an oil passage inside thereof; an opening and closing member provided inside of the main body in a slide manner to open and close the oil passage; an elastic member configured to elastically press the opening and closing member toward the oil passage side; and a plug member installed in the main body to support the elastic member, wherein the main body comprises: a body portion having a first port portion arranged on one side thereof and a second port portion arranged on another side thereof in a longitudinal direction; and a partition disposed inside of the body portion and dividing the oil passage into a first oil passage connected to the first port portion and a second oil passage connected to the second port portion, wherein the first oil passage and the second oil passage are fluidly separated from each other when the opening and closing member is in contact with the partition, and wherein
oil flows through the oil passage in one direction when a force is applied to a clutch pedal, and the oil flows in an opposite direction to the one direction when the force is released from the clutch pedal.

12. The clutch regulator of claim 1, wherein
an outermost circumference of the opening and closing member slides along, while being in contact with, the inner circumferential surface of the coupling portion when a force is applied to or released from a clutch pedal.

* * * * *